United States Patent
Dawson et al.

(10) Patent No.: US 10,567,481 B2
(45) Date of Patent: *Feb. 18, 2020

(54) WORK ENVIRONMENT FOR INFORMATION SHARING AND COLLABORATION

(71) Applicant: INTERNATIONAL BUSINESS MACHINES CORPORATION, Armonk, NY (US)

(72) Inventors: Christopher J. Dawson, Arlington, VA (US); Barry M. Graham, Silver Spring, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/653,123

(22) Filed: Jul. 18, 2017

(65) Prior Publication Data

US 2017/0318080 A1 Nov. 2, 2017

Related U.S. Application Data

(63) Continuation of application No. 13/906,688, filed on May 31, 2013, now Pat. No. 9,749,395.

(51) Int. Cl.
*G06F 9/48* (2006.01)
*H04L 29/08* (2006.01)
*G06Q 10/10* (2012.01)

(52) U.S. Cl.
CPC ............. *H04L 67/10* (2013.01); *G06Q 10/10* (2013.01)

(58) Field of Classification Search
CPC .............................. H04L 67/10; G06Q 10/10
See application file for complete search history.

(56) References Cited

U.S. PATENT DOCUMENTS

| | | | |
|---|---|---|---|
| 7,461,347 B2 | 12/2008 | Zhu et al. | |
| 8,117,560 B1 | 2/2012 | Lu et al. | |
| 2001/0044858 A1 | 11/2001 | Rekimoto | |
| 2004/0235520 A1 | 11/2004 | Cadiz et al. | |
| 2005/0132299 A1 | 6/2005 | Jones et al. | |
| 2005/0240873 A1 | 10/2005 | Czerwinski et al. | |
| 2007/0033539 A1* | 2/2007 | Thielman | G06F 1/16 |
| | | | 715/769 |

(Continued)

OTHER PUBLICATIONS

Bartoli, et al., "Rainbow Crypt: Securing Communication Through a Protected Visual Channel", 11th International Conference on Intelligent Systems Design and Applications, 2011; pp. 72-75.

*Primary Examiner* — Jennifer N To
*Assistant Examiner* — KC Chen
(74) *Attorney, Agent, or Firm* — William Hartwell; Andrew M. Calderon; Roberts Mlotkowski Safran Cole & Calderon P.C.

(57) ABSTRACT

An approach for collaboration is provided. An approach includes linking a first user device to a first collaboration screen of a work environment and a second user device to a second collaboration screen of the work environment. The approach also includes displaying data associated with the first user device on the first collaboration screen. The approach further includes detecting manipulation of the data at the first collaboration screen. The approach additionally includes displaying a copy of the data on the second collaboration screen based on the detecting.

18 Claims, 8 Drawing Sheets

(56) References Cited

U.S. PATENT DOCUMENTS

| | | | |
|---|---|---|---|
| 2007/0064004 A1* | 3/2007 | Bonner | G06F 3/04883 |
| | | | 345/442 |
| 2011/0083111 A1 | 4/2011 | Forutanpour et al. | |
| 2011/0137947 A1* | 6/2011 | Dawson | G06F 21/604 |
| | | | 707/785 |
| 2012/0110576 A1 | 5/2012 | Lin et al. | |
| 2012/0218200 A1 | 8/2012 | Glazer et al. | |
| 2012/0235926 A1 | 9/2012 | Sip | |
| 2012/0240078 A1 | 9/2012 | Kung | |
| 2012/0254746 A1* | 10/2012 | Avadhanam | H04L 67/06 |
| | | | 715/702 |
| 2012/0278738 A1 | 11/2012 | Kruse et al. | |
| 2012/0282914 A1 | 11/2012 | Alexander | |
| 2013/0194238 A1 | 8/2013 | Sakai | |
| 2015/0100900 A1 | 4/2015 | Mao et al. | |
| 2015/0188993 A1 | 7/2015 | Dibner | |

\* cited by examiner

WORK ENVIRONMENT FOR INFORMATION SHARING AND COLLABORATION

TECHNICAL FIELD

The present invention generally relates to computer-based collaboration and, more particularly, to sharing information in a group collaborative setting.

BACKGROUND

Mobile computing devices are ubiquitous in most work and social settings. It is a common occurrence that people in a group setting wish to share content between their mobile devices. For example, a first person in a group at a coffee shop may wish to share a photograph stored on their smart phone with a second person in the group having a tablet computer. As another example, a first person in a group at an office conference room may wish to share a spreadsheet stored on their laptop with another member of the group having another laptop. Such sharing of information typically involves emailing the file from the device of one user to the device of the other user. However, emailing involves a relatively large number of steps that makes the sharing information burdensome, such as accessing an email application, creating a new email, attaching the document to the email, entering the recipient email address in the email, and transmitting the email.

SUMMARY

In a first aspect of the invention, there is a method implemented in a computer infrastructure including a combination of hardware and software. The method includes linking a first user device to a first collaboration screen of a work environment and a second user device to a second collaboration screen of the work environment. The method also includes displaying data associated with the first user device on the first collaboration screen. The method further includes detecting manipulation of the data at the first collaboration screen. The method additionally includes displaying a copy of the data on the second collaboration screen based on the detecting.

In an additional aspect of the invention, there is a computer program product including a computer usable storage device having readable program code embodied in the storage device. The computer program product includes at least one component operable to wirelessly link a first user device to a first collaboration screen of a work environment, and wirelessly link a second user device to a second collaboration screen of the work environment. At least one component is further operable to display, on the first collaboration screen, an icon of a file stored on the first user device. At least one component is also operable to detect manipulation of the icon on the first collaboration screen. At least one component is additionally operable to display a copy of the icon on the second collaboration screen based on the detecting the manipulation. At least one component is still further operable to detect one of acceptance and denial at the second collaboration screen based on the displaying the copy of the icon. When acceptance is detected, at least one component is operable to cause a copy of the file to be stored on the second user device. When denial is detected, at least one component is operable to remove the copy of the icon from the second collaboration screen.

In a further aspect of the invention, there is a system including a work environment that includes collaboration screens. The system includes a CPU, a computer readable memory and a computer readable storage media. The system further includes program instructions to link a first user device to a first one of the collaboration screens and a second user device to a second one of the collaboration screens. The system additionally includes program instructions to display data stored on the first user device on the second one of the collaboration screens based on detecting manipulation of an icon of the data on the first one of the collaboration screens. The program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to computer-based collaboration and, more particularly, to sharing information in a group collaborative setting. According to aspects of the invention, there is a work environment comprising a smart table having a plurality of collaboration screens, each of which may be linked with a mobile computer device of a user. When plural users have their devices linked to the collaboration screens, a user may share a file stored on their device with another user by manipulating an icon of the file displayed on their collaboration screen. For example, a collaboration screen that is linked to a user device may display icons of files stored on the user device, and the user may share one of their files with another user by moving an icon of the file on the collaboration screen. The moving the icon may include using a finger or mouse to drag the icon to a share area of the collaboration screen, or flicking the icon on the collaboration screen in the direction of another user at the smart table. In this manner, implementations of the invention provide the ability to share data in a collaborative setting with a minimal number of steps.

Aspects of the invention are described herein with respect to a work environment comprising a smart table. However, the work environment is not limited to use with a table, and instead can be implemented with any desired arrangement of collaboration screens in any suitable physical structure(s), including tables, walls, partitions, etc.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium and/or device. A computer readable storage medium and/or device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium and/or device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium and/or device may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
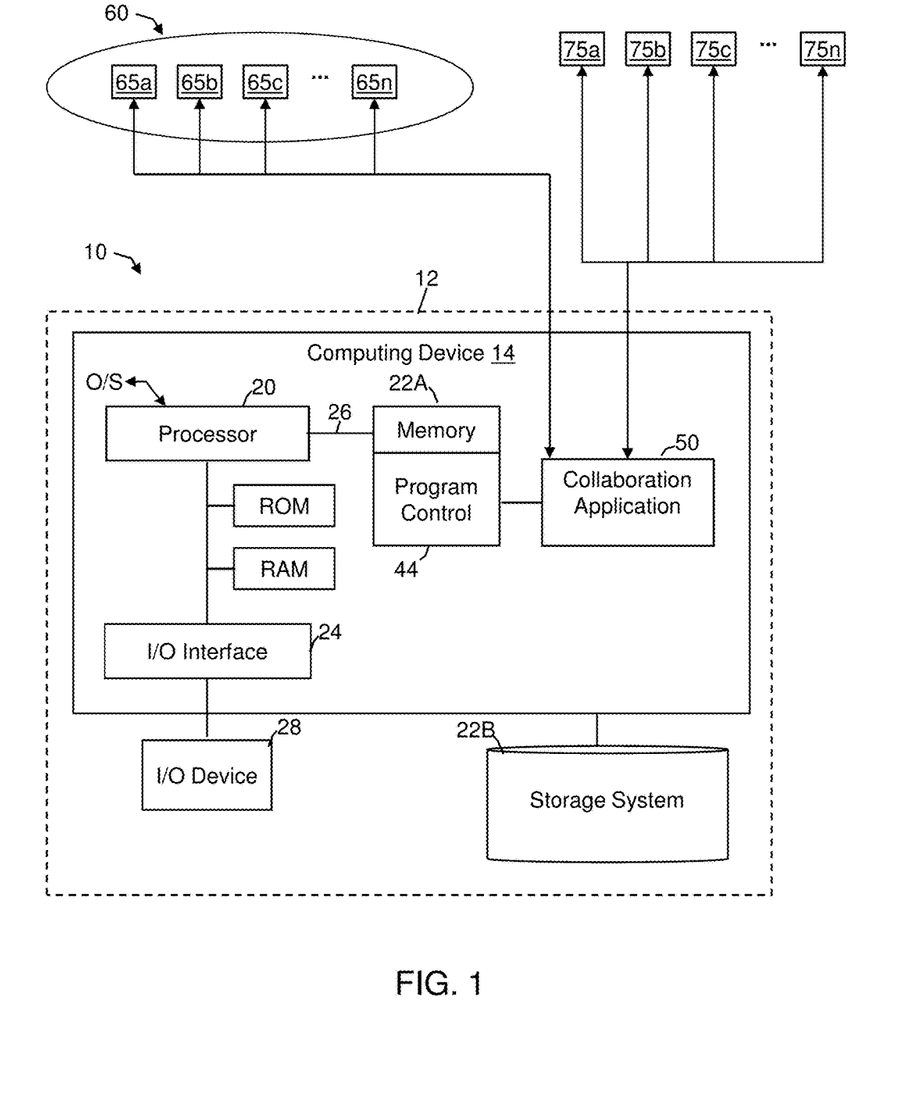
FIG. 1 is an illustrative environment for implementing the steps in accordance with aspects of the invention.

FIG. 1 shows an illustrative environment 10 for managing the processes in accordance with the invention. To this extent, environment 10 includes a server or other computing system 12 that can perform the processes described herein. In particular, server 12 includes a computing device 14. The computing device 14 can be resident on a network infrastructure or computing device of a third party service provider (any of which is generally represented in FIG. 1).

The computing device 14 also includes a processor (CPU) 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard, etc.

In general, processor 20 executes computer program code (e.g., program control 44), which can be stored in memory 22A and/or storage system 22B. Moreover, in accordance with aspects of the invention, program control 44 controls a collaboration application 50 that is configured to perform one or more of the processes described herein. The collaboration application 50 can be implemented as one or more program code in program control 44 stored in memory 22A as separate or combined modules. Additionally, collaboration application 50 may be implemented as separate dedicated processors or a single or several processors to provide the function of these tools. While executing the computer program code, processor 20 can read and/or write data to/from memory 22A, storage system 22B, and/or I/O interface 24. The program code executes the processes of the invention. The bus 26 provides a communications link between each of the components in computing device 14.

In embodiments, the collaboration application 50 may be any suitable application that links collaboration screens 65a-n of a smart table 60 to user computer devices 75a-n and manages the transfer of data between the user computer devices 75a-n based on user manipulation of icons displayed on the collaboration screens 65a-n. The collaboration application 50 may be plural separate applications. In other embodiments, the functionality of collaboration application 50 may be provided by a single application.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, computing infrastructure 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
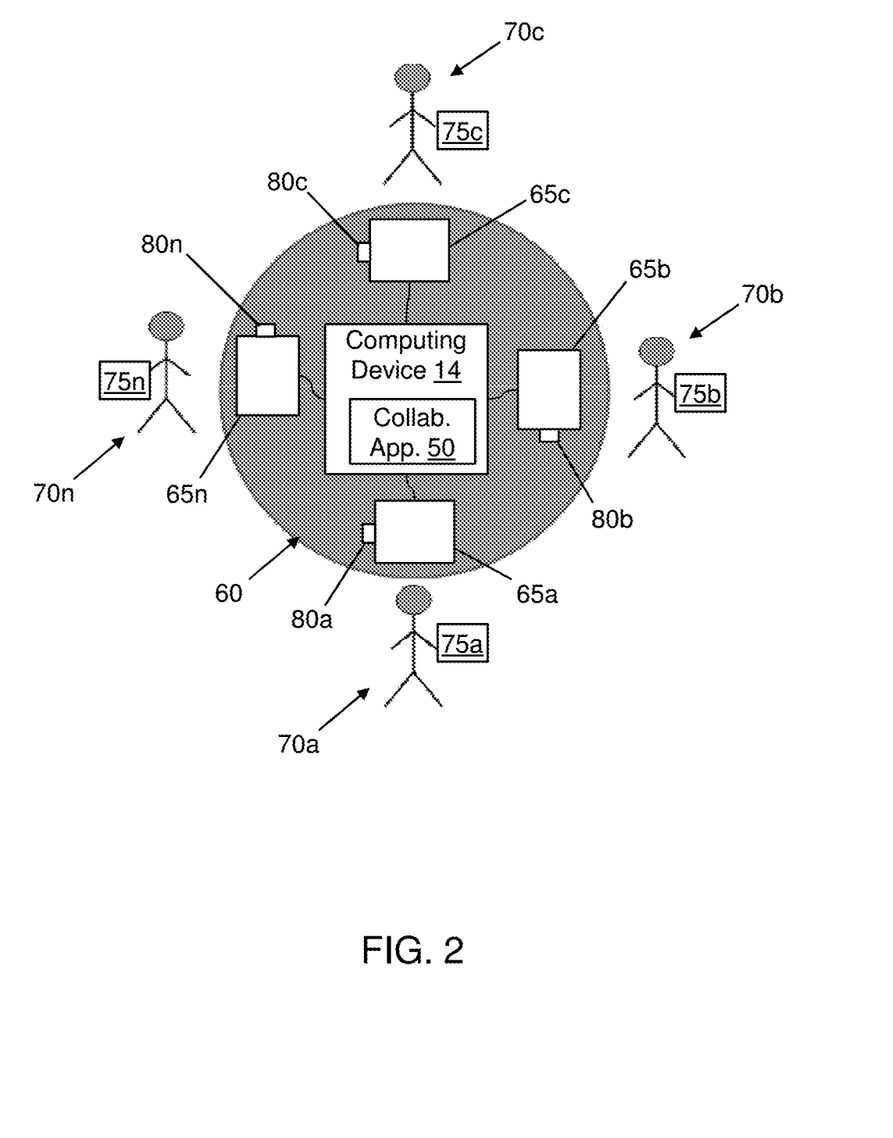
FIG. 2 shows a block diagram of a system in accordance with aspects of the invention.

FIG. 2 shows a block diagram of an exemplary system in accordance with aspects of the invention. In embodiments, the system includes a work environment comprising a smart table 60 comprising a plurality of collaboration screens 65a-n operatively connected to computing device 14 running collaboration application 50. The computing device 14 may be incorporated into smart table 60, or may be physically separate from smart table 60. The collaboration screens 65a-n may include, for example, touch-screen displays similar to the type commonly utilized with tablet computers and smart phones.

With continued reference to FIG. 2, a plurality of users 70a-n may each possess a mobile computing user device 75a-n, such as a smart phone, tablet computer, laptop computer, etc. In accordance with aspects of the invention, each user 70a-n may link their respective user device 75a-n to one of collaboration screens 65a-n. In embodiments, a particular collaboration screen (e.g., 65a) that is linked to a particular user device (e.g., 75a) visually displays icons associated with files that are stored on the particular user device (e.g., 75a). In one exemplary embodiment, the particular collaboration screen (e.g., 65a) simultaneously displays the same information that is currently displayed on the particular user device (e.g., 75a), such as an exact representation of the visual display of the particular user device (e.g., 75a). In another exemplary embodiment, the particular collaboration screen (e.g., 65a) displays the files contained in a predefined or user-selected folder, directory, etc., that is stored on the particular user device (e.g., 75a).

According to aspects of the invention, respective ones of collaboration screens 65a-n are linked to respective ones of user devices 75a-n via computing device 14 running collaboration application 50. In embodiments, each respective user device 75a-n communicates wirelessly with computer device 14 via Bluetooth or other local wireless communication protocol. In an exemplary implementation, each respective user device 75a-n is paired to computer device 14 using Bluetooth as is understood in the art, although the invention is not limited to Bluetooth pairing and any suitable linking may be used. Moreover, computing device 14 may be configured to accept different pairing protocols for different user devices 75a-n. In embodiments, each user device 75a-n is provided with an application, software agent, or the like, that facilitates establishing communication with computer device 14, e.g., a listener application that receives a message from computing device 14 when a user registers with one of collaboration screens 65a-n. In this manner, data that defines what is displayed on a particular collaboration screen (e.g., 65a) is transmitted from a particular user device (e.g., 75a) to computing device 14, and then from computing device 14 to the particular collaboration screen (e.g., 65a).

Still referring to FIG. 2, a user may link their user device 75a-n with a particular one of the collaboration screens 65a-n by providing a registration to the particular collaboration screen 65a-n. The registration may include a thumb print, typed login, or any other suitable input. For example, each collaboration screen 65a-n may be provided with a thumb print scanning mechanism 80a-n, and a user may link their user device 75a-n with a particular one of collaboration screens 65a-n by scanning their thumb at the particular collaboration screen 65a-n. As another example, each collaboration screen 65a-n may be provided with a keyboard or keypad, and a user may link their user device 75a-n with a particular one of collaboration screens 65a-n by inputting a login credential (e.g., username and/or password) at the particular collaboration screen 65a-n.

The computer device 14 may store data that defines an association between a respective user's registration (e.g., thumb print, login credential, etc.) and a respective one of user devices 75a-n. Upon detecting the user's registration (e.g., thumb print, login credential, etc.) at a particular collaboration screen (e.g., 65a), computing device 14 may determine an identity of the particular user device (e.g., 75a) based on the pre-defined association and send a wireless communication to the particular user device (e.g., 75a) to establish a wireless communication link between computing device 14 and the particular user device (e.g., 75a). In embodiments, collaboration application 50 stores a temporary association between the particular user device (e.g., 75a) and the particular collaboration screen (e.g., 65a) at which the user provided the registration (e.g., thumb print, login credential, etc.). In this manner, collaboration application 50 temporarily associates a particular user device (e.g., 75a) with a particular collaboration screen (e.g., 65a), which facilitates sharing information between respective ones of the user devices 75a-n as described in greater detail herein.

Figures 3A, 3B, 3C:
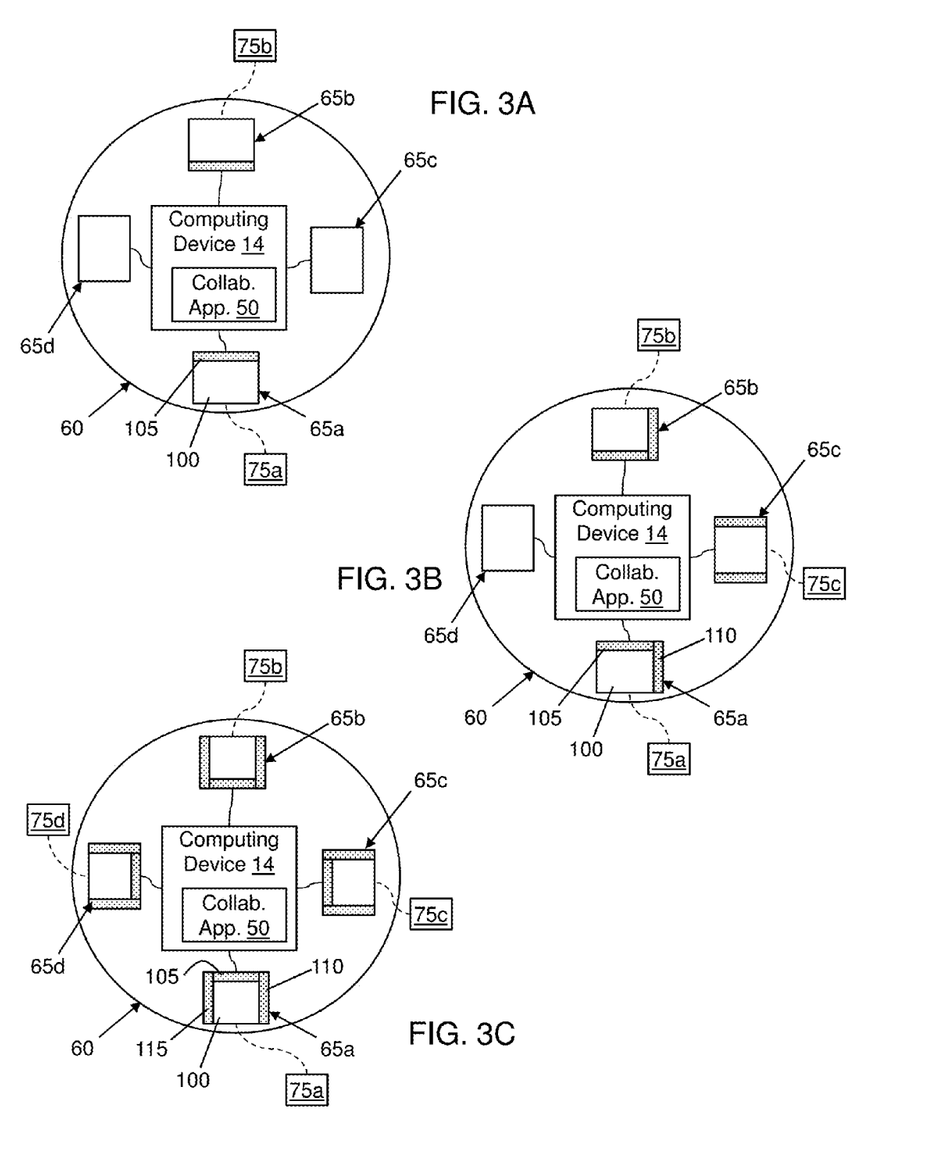
FIGS. 3A-C show exemplary displays of collaboration screens at a smart table in accordance with aspects of the invention.

FIGS. 3A-C show exemplary displays of collaboration screen 65a-d at a smart table 60 in accordance with aspects of the invention. FIG. 3A depicts a first illustrative example in which first user device 75a is linked to first collaboration screen 65a, second user device 75b is linked to second collaboration screen 65b, and no user devices are linked to third and fourth collaboration screens 65c and 65d. The linking may be accomplished via computing device 14, e.g., in a manner similar to that describes with respect to FIG. 2. In the example shown in FIG. 3A, first collaboration screen 65a includes a main area 100 that displays content of first user device 75a (e.g., the same display as first user device 75a, icons of files stored in a particular folder or directory on first user device 75a, etc.) and a share area 105 that corresponds to second collaboration screen 65b. The share area 105 may be used by the first user to share data stored on first device 75a with second device 75b, as described in greater detail herein. In embodiments, the location of share area 105 on first collaboration screen 65a corresponds to the smart table location of second collaboration screen 65b relative to smart table location of first collaboration screen 65a. For example, in FIG. 3A, second collaboration screen 65b is across from first collaboration screen 65a at smart table 60, such that share area 105 is shown at the top of first collaboration screen 65a. As shown in FIG. 3A, second collaboration screen 65b also displays a main area that displays content of second device 75b, and a share area corresponding to first collaboration screen 65a.

FIG. 3B depicts a second illustrative example in which first user device 75a is linked to first collaboration screen 65a, second user device 75b is linked to second collaboration screen 65b, third user device 75c is linked to third collaboration screen 65c, and no user device is linked to the fourth collaboration screen 65d. The linking may be accomplished via computing device 14, e.g., in a manner similar to that describes with respect to FIG. 2. In the example shown in FIG. 3B, first collaboration screen 65a includes main area 100, share area 105 corresponding to the second collaboration screen 65b, and another share area 110 corresponding to the third collaboration screen 65c. The locations of share areas 105 and 110 on first collaboration screen 65a correspond to the locations of second collaboration screen 65b and third collaboration screen 65c relative to first collaboration screen 65a at smart table 60. As shown in FIG. 3B, second collaboration screen 65b also displays a main area, a share area corresponding to first collaboration screen 65a, and another share area corresponding to third collaboration screen 65c. Similarly, third collaboration screen 65c displays a main area, a share area corresponding to first collaboration screen 65a, and another share area corresponding to second collaboration screen 65b.

FIG. 3C depicts a third illustrative example in which first user device 75a is linked to first collaboration screen 65a, second user device 75b is linked to second collaboration screen 65b, third user device 75c is linked to third collaboration screen 65c, and fourth user device 75d is linked to fourth collaboration screen 65d. The linking may be accomplished via computing device 14, e.g., in a manner similar to that describes with respect to FIG. 2. In the example shown in FIG. 3C, first collaboration screen 65a includes main area 100, share area 105 corresponding to second collaboration screen 65b, share area 110 corresponding to third collaboration screen 65c, and share area 115 corresponding to fourth collaboration screen 65d. The locations of share areas 105, 110 and 115 on first collaboration screen 65a correspond to the locations of second collaboration screen 65b, third collaboration screen 65c, and fourth collaboration screen 65d relative to first collaboration screen 65a at smart table 60. As shown in FIG. 3C, second collaboration screen 65b, third collaboration screen 65c, and fourth collaboration screen 65d each display a main area and respective share areas corresponding to the other collaboration screens.

FIGS. 4A-D show an implementation of collaborative file transferring using collaboration screens 65a and 65b in accordance with aspects of the invention. As depicted in FIGS. 4A-D, collaboration screen 65a is linked to user device 75a via computing device 14, and collaboration screen 65b is linked to user device 75b via computing device 14, e.g., in the manner described with respect to FIG. 2. The collaboration screens 65a and 65b may be included in a smart table (e.g., smart table 60 as described herein) having any desired number of collaboration screens. Collaboration screen 65a includes a main area 100 and a share area 105 corresponding to collaboration screen 65b. Collaboration screen 65b includes a main area 100' and a share area 105' corresponding to collaboration screen 65a.

Figure 4A:
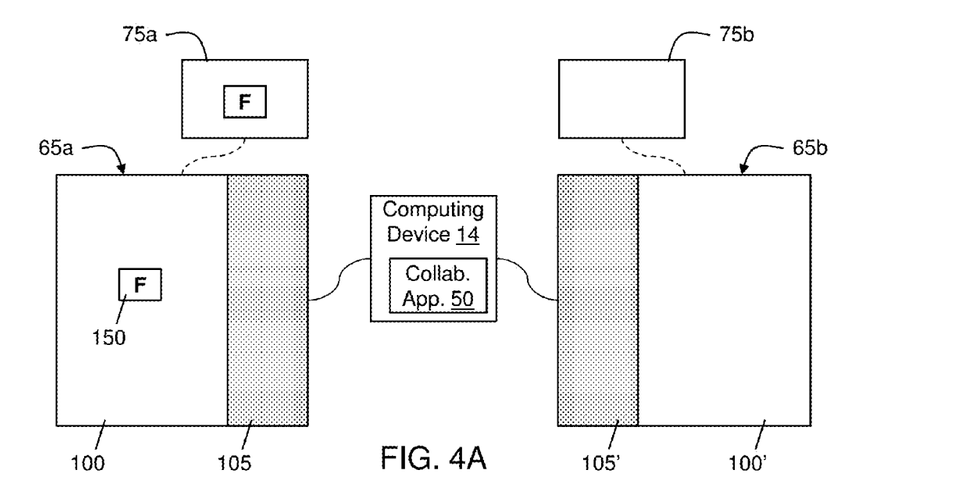
FIGS. 4A-D show an exemplary implementation of collaborative file transferring using collaboration screens in accordance with aspects of the invention.

In embodiments, collaboration application 50 running on computing device 14 communicates with user devices 75a and 75b and collaboration screens 65a and 65b, and manages the display of content of the respective user devices 75a and 75b on the respective collaboration screens 65a and 65b. For example, as shown in FIG. 4A, user device 75a has a file "F" stored thereon, and collaboration application 50 is programmed to cause collaboration screen 65a to display an icon 150 corresponding to file "F" when user device 75a is linked to collaboration screen 65a.

Figure 4B:
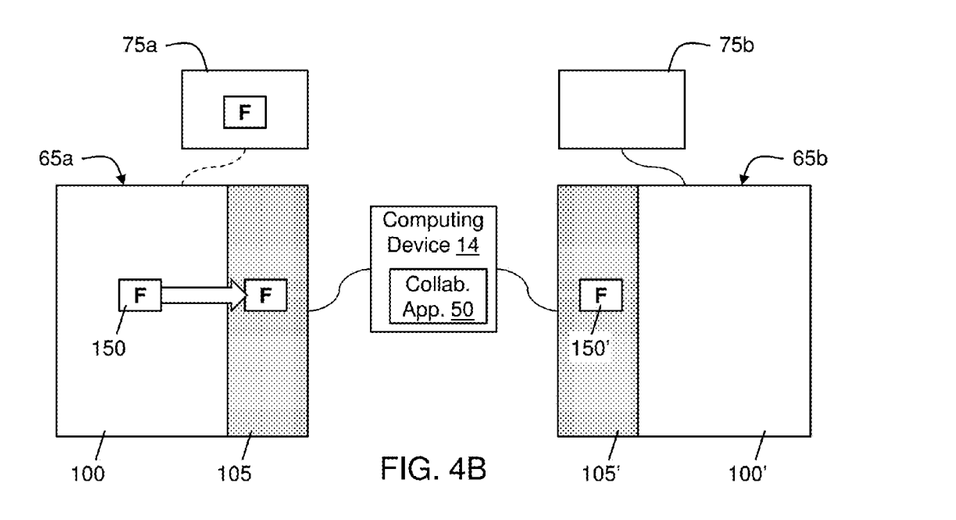

As shown in FIG. 4B, and according to aspects of the invention, the user associated with collaboration screen 65a may share the file "F" with the user associated with collaboration screen 65b by manipulating icon 150 on collaboration screen 65a. In embodiments, when the user associated with collaboration screen 65a moves icon 150 into share area 105 corresponding to collaboration screen 65b, collaboration application 50 detects this movement and causes an icon 150' of the file "F" to be displayed in share area 105' of collaboration screen 65b. The moving of icon 150 may be performed using a touch-screen functionality of collaboration screen 65a, e.g., the user placing their finger in contact with the surface of the collaboration screen 65a over icon 150 and then moving their finger across the surface of collaboration screen 65a to drag icon 150 to share area 105 as indicated by the arrow in FIG. 4B.

Figure 4C:
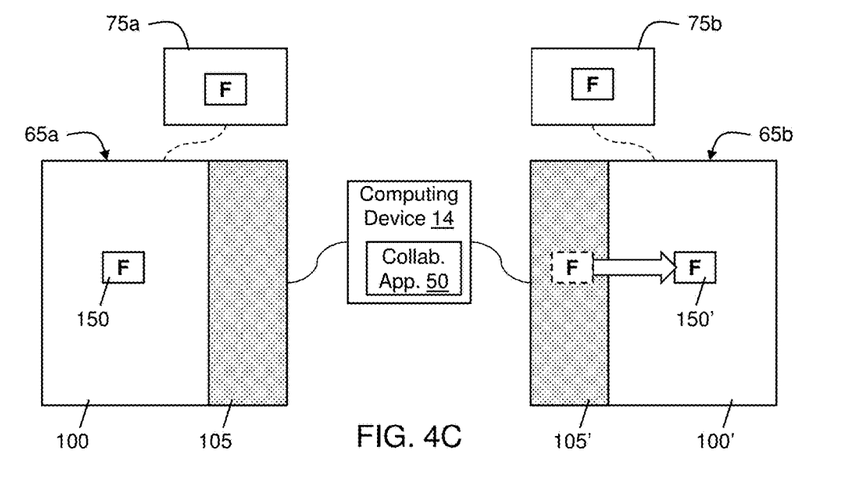

As shown in FIG. 4C, the user associated with collaboration screen 65b may accept file "F" by moving icon 150' from share area 105' to main area 100' of collaboration screen 65b, e.g., as indicated by the block arrow in FIG. 4C. The movement may be touch screen movement of an icon, as already described herein. In embodiments, collaboration application 50 detects this movement and causes a copy of file "F" to be transferred to and stored on user device 75b linked to collaboration screen 65b. The copy of file "F" may be transmitted directly from user device 75a to user device 75b, or may be transmitted from user device 75a to computing device 14 and then from computing device 14 to user device 75b. In this manner, implementations of the invention permit users at the smart table to easily share files between their respective mobile devices (e.g., devices 75a-n) with single finger gestures associated with their respective collaboration screens.

Still referring to FIG. 4C, in the event the user associated with collaboration screen 65b does not wish to accept the file "F", then the user may simply leave the icon 150' in the share area 105'. In embodiments, the collaboration application 50 is configured to automatically delete the icon 150' from the share area 105' after a predetermined amount of time. In this manner, the user of the collaboration screen 65b has the option to accept the file "F" (e.g., by moving the icon into the main area 100') or deny the file "F" (e.g., by leaving the icon 150' in the share area 105' until it is automatically deleted by the collaboration application 50).

Figure 4D:
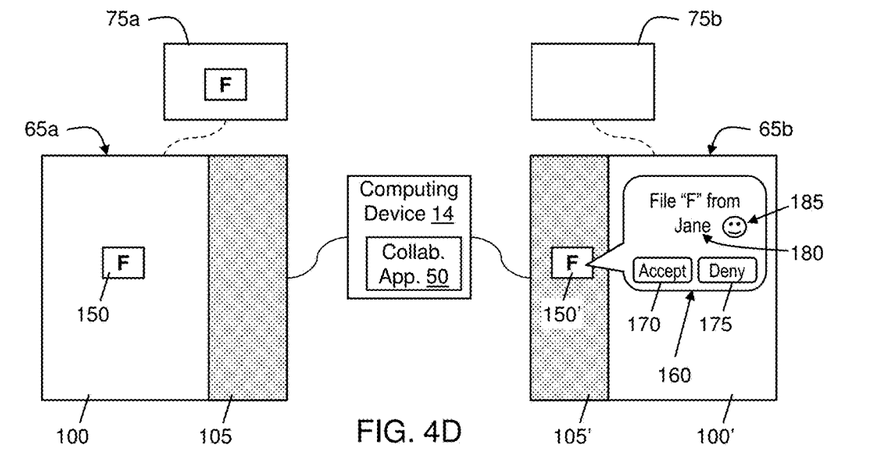

FIG. 4D depicts an implementation in which collaboration application 50 alerts the recipient of the file of the sharing. In embodiments, when icon 150' appears in share area 105', collaboration application 50 causes collaboration screen 65b to display a message 160. The message 160 may include an indication of the file (e.g., filename "F"), a field 170 to accept the file, and a field 175 to deny the file. In embodiments, when the user of collaboration screen 65b selects field 170 (e.g., using touch screen control), icon 150' is moved from share area 105' to main area 100' and a copy of file "F" is transferred to and stored on user device 75b, e.g., in a manner similar to that described with respect to FIG. 4C. In embodiments, when the user of collaboration screen 65b selects field 175 (e.g., using touch screen control), icon 150' is removed from share area 105' and file "F" is not transferred to user device 75b. The message 160 may optionally include a username 180 (e.g., "Jane") and/or avatar 185 that identifies the sender of the shared file, e.g., the user associated with user device 75a that collaboration application 50 may obtain or receive from user device 75a.

Figure 5A:
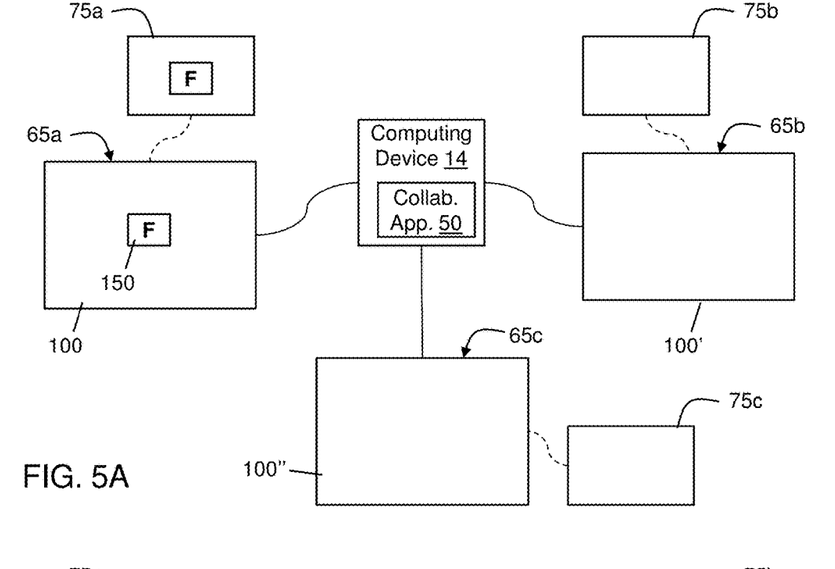
FIGS. 5A-C show an exemplary implementation of collaborative file transferring using collaboration screens in accordance with aspects of the invention.
Figure 5B:
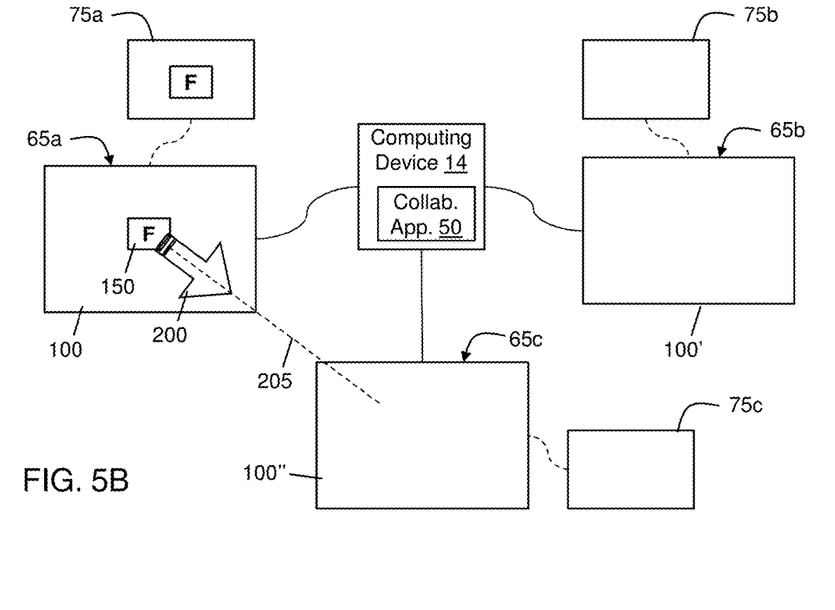
Figure 5C:
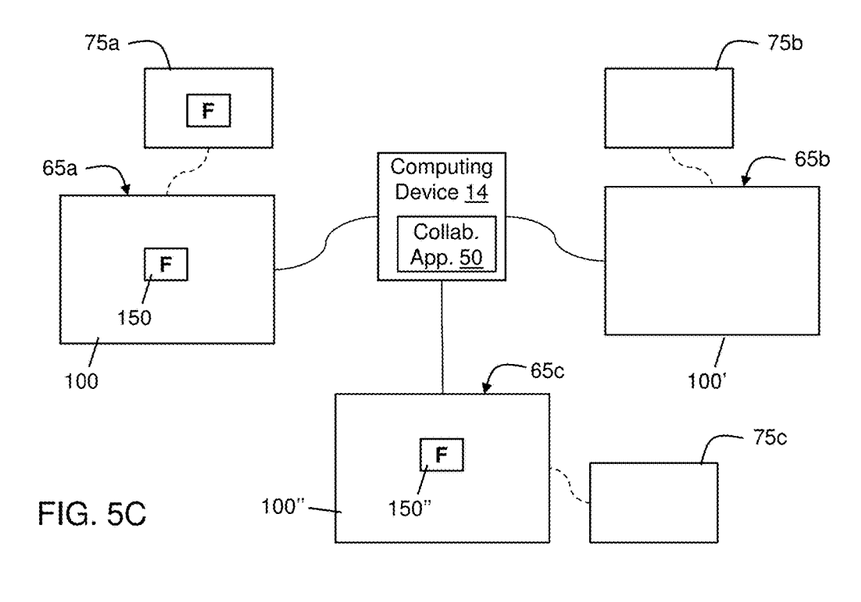

FIGS. 5A-C show another implementation of collaborative file transferring using collaboration screens 65a-c in accordance with aspects of the invention. As depicted in FIGS. 5A-C, collaboration screen 65a is linked to user device 75a via computing device 14, collaboration screen 65b is linked to user device 75b via computing device 14, and collaboration screen 65c is linked to user device 75c via computing device 14, e.g., in the manner described with respect to FIG. 2. The collaboration screens 65a-c may be included in a smart table (e.g., smart table 60 as described herein) having any desired number of collaboration screens. Collaboration screen 65a includes main area 100, collaboration screen 65b includes main area 100', and collaboration screen 65c includes main area 100". As shown in FIG. 5A, collaboration screen 65a displays icon 150 corresponding to file "F" that is stored on user device 75a, e.g., in a manner similar to that described with respect to FIG. 4A.

As depicted in FIG. 5B, the user associated with collaboration screen 65a may share file "F" with the user associated with collaboration screen 65c by flicking icon 150 in the direction of collaboration screen 65c. The flicking is indicated by arrow 200 and may include, for example, a user placing their finger on the surface of collaboration screen 65a over icon 150, and flicking or similarly moving their finger in the direction of another collaboration screen, which is referred to herein as a flick or flick gesture. The collaboration application 50 may determine the direction of the flick based on a path the user's finger travels across the surface of collaboration screen 65a. In embodiments, collaboration application 50 extrapolates a straight line 205 in the determined direction of the flick, and determines which one of the collaboration screens is intersected by line 205. For example, collaboration application 50 may store data (e.g., coordinates) that defines a spatial location of each of the collaboration screens 65a-c at the smart table, and use the coordinate data and the extrapolated line 205 to determine which one of collaboration screens 65b-c is intersected by extrapolated line 205.

As depicted in FIG. 5C, collaboration application 50 causes an icon 150" of file "F" to be displayed on the collaboration screen that is determined to intersect the extrapolated line, e.g., collaboration screen 65c in this example. In embodiments, collaboration application 50 visually moves icon 150" across collaboration screen 65b along the direction of the extrapolated line before icon 150" comes to a stop somewhere in main area 100". This directional movement of icon 150" on the receiving collaboration screen 65c provides the user associated with the receiving collaboration screen 65c the ability to see which direction the file came from, e.g., from collaboration screen 65a in this example. The collaboration application 50 may control the speed of the directional movement of icon 150" on collaboration screen 65c based on how hard or fast the sending user flicked icon 150 at collaboration screen 65a. Additionally or alternatively, collaboration application 50 may display a message (e.g., similar to message 160) on the receiving collaboration screen, e.g., collaboration screen 65c in this example. A copy of file "F" may be saved on the user device associated with the receiving collaboration screen, e.g., user device 75c in this example.

In embodiments, in the event the extrapolated line intersects more than one collaboration screen, collaboration application 50 may determine which one of the intersected collaboration screens is the intended recipient based on how hard or fast the sending user flicked icon 150 at collaboration screen 65a. For example, collaboration application 50 may determine an initial speed of travel of icon 150 (e.g., an initial speed of the flick gesture) based on how hard or fast the sending user flicks icon 150 at collaboration screen 65a, e.g., in a manner similar to a flick-based scrolling speed utilized on touch screen displays of smart phones and tablet computers. The collaboration application 50 may then use the determined initial speed of travel, a pre-defined rate of deceleration, and the coordinate data of the intersected collaboration screens to determine which one of the intersected collaboration screens is the intended recipient of file "F".

In accordance with aspects of the invention, a user may be provided with the ability to select from one of many options for displaying data on the collaboration screen. For example, upon a user registering with a particular collaboration screen, the collaboration application 50 may display a message on the particular collaboration screen that permits the user to select a share area display (e.g., as in FIGS. 4A-D) or a flick-based display (e.g., as in FIGS. 5A-C).

Flow Diagrams

Figure 6:
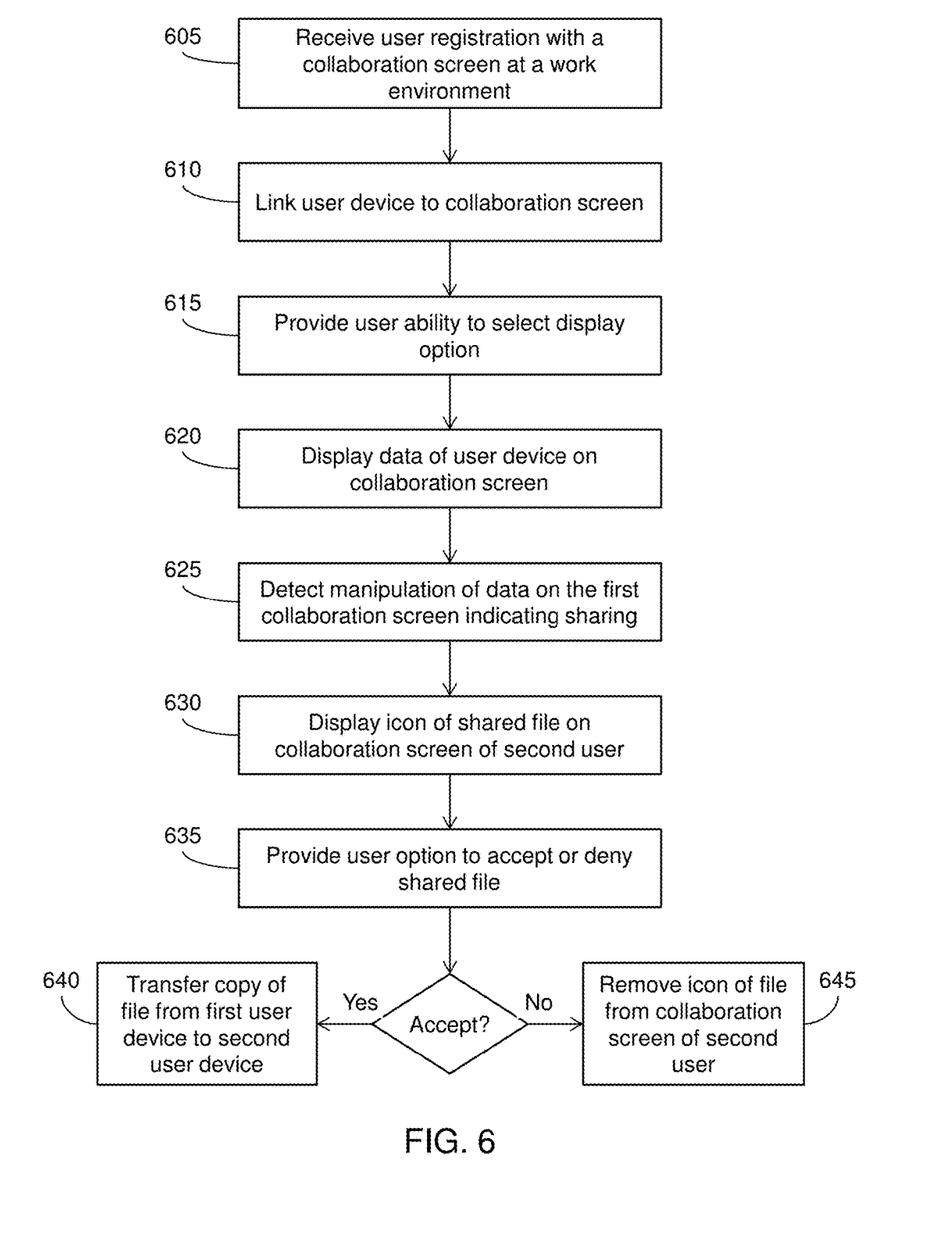
FIG. 6 shows an exemplary flow diagram for implementing methods in accordance with aspects of the invention.

FIG. 6 shows exemplary flowcharts and/or block diagrams for performing aspects of the present invention. The steps and/or functions of FIG. 6 may be implemented in the environment of FIGS. 1-5, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-5. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 6 depicts an exemplary flowchart depicting a process in accordance with aspects of the present invention. At step 605, a user (e.g., user 70a) registers with a respective collaboration screen (e.g., collaboration screen 65a) at a work environment (e.g., smart table 60). The registration may include, for example, the user providing a thumb print, typed login, or the like, as described with respect to FIG. 2. Step 605 includes a computing device associated with the smart table (e.g., computing device 14 running collaboration application 50) receiving the registration.

At step 610, the computing device links a user device associated with the user (e.g., user device 75a) to the respective collaboration screen based on the registration of step 605. The linking may be performed in the manner described with respect to FIG. 2 and may include, for example, establishing wireless communication between the computing device and the user device.

At step 615, the computing device optionally provides the user with the ability to select from one of many options for displaying data on the collaboration screen. For example, the computing device may display a message on the collaboration screen that permits the user to select a share area display (e.g., as in FIGS. 4A-D) or a flick-based display (e.g., as in FIGS. 5A-C). Step 615 may include the computing device receiving an indicated display option from the user.

At step 620, based on the linking and the optional display selection, the computing device causes the collaboration screen to display one or more icons corresponding to file(s) on the user device. For example, the computing device may cause the collaboration screen to display substantially the same display as is currently displayed on the user device. As another example, the computing device may cause the collaboration screen to display the contents of a pre-defined folder stored on the user device.

Steps 605, 610, 615, and 620 may be repeated at any time for at least one other user. In this manner, at least two users may have their respective user devices linked to respective collaboration screens of the smart table. For example, a first user may be associated with a first collaboration screen of the smart table (e.g., by having their user device linked to the first collaboration screen), and a second user may be associated with a second collaboration screen of the same smart table (e.g., by having their user device linked to the second collaboration screen).

At step 625, the computing device detects a manipulation of the data on the first collaboration screen which manipulation indicates an intent to share the data with another user of another collaboration screen. For example, the first user may employ their collaboration screen to initiate sharing a file with a second user associated with a second collaboration screen. In embodiments, the sharing is initiated by the first user manipulating an icon that is displayed on their collaboration screen, e.g., in a manner described with respect to FIGS. 4A-D or FIGS. 5A-C. For example, the first user may drag an icon to a share area of their collaboration screen, the share area corresponding to the collaboration screen of the intended recipient of the file (e.g., as described with respect to FIGS. 4A-D). As another example, the first user flicks an icon on that is displayed on their collaboration screen in the direction of the collaboration screen of the intended recipient of the file (e.g., as described with respect to FIGS. 5A-C). Step 625 may include the computing device receiving and/or detecting the manipulation of the icon at the first collaboration screen.

At step 630, the computing device causes a copy of the icon of step 625 to be displayed on the collaboration screen of the intended recipient of the file based on the detected manipulation at step 625. In one example, the computing device causes the copy of the icon to be displayed in a share area of the recipient collaboration screen (e.g., as described with respect to FIGS. 4A-D). In another example, the computing device causes the copy of the icon to be displayed as moving across the recipient collaboration screen in a direction from the sender collaboration screen and eventually coming to a stop on the recipient collaboration screen (e.g., as described with respect to FIGS. 5A-C).

At step 635, the computing device provides the receiving user (e.g., the second user) the option to accept or deny the shared file. In one example, the computing device displays a message (e.g., message 160) on the recipient collaboration screen providing the receiving user (e.g., the second user) with input fields (e.g., buttons displayed on the collaboration screen) to accept or deny the shared file. The second user indicates acceptance by selecting one of the fields and indicates denial by selecting another one of the fields (e.g., touching one of an "accept" button and a "deny" button that are displayed on the second collaboration screen). In another example, the user indicates acceptance by dragging the copy of the icon from the share area to the main area of the second collaboration screen, and indicates denial by leaving the icon in the share area for a predetermined amount of time that causes the share to expire (e.g., time out). Step 635 may include the computing device receiving the acceptance or denial from the second user.

In the event the second user accepts the shared file, then at step 640 a copy of the file is transmitted from the first user device (e.g., user device 75a) to the second user device (e.g., user device 75b) either directly between the two user devices or indirectly via the computing device. At this point, the second user may access (e.g., open, view, etc.) the shared file on the second collaboration screen and/or the second user device. On the other hand, in the event the second user denies the shared file, then at step 645 the computing device removes the icon from the second collaboration screen and does not transfer a copy of the file to the second user device.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure comprising a combination of hardware and software, the method comprising:
   linking a first user device to a first screen of a smart table and a second user device to a second screen of the smart table, wherein the first user device and the second user device are separate devices from one another and from the first and second screens;
   displaying data associated with the first user device on the first screen;
   detecting manipulation of the data at the first screen, wherein the detecting the manipulation includes detecting a flick gesture of the data on the first screen;
   displaying a copy of the data on the second screen based on the detecting;
   determining a direction of the flick gesture;
   extrapolating a line based on the determined direction;
   determining whether the extrapolated line intersects the second screen and a third screen which is located on the smart table based on coordinate data regarding spatial locations of the second screen and the third screen on the smart table;
   determining a speed of the flick gesture; and determining whether an intended recipient of the data on the first screen is the second screen or the third screen based on an initial speed of travel of the flick gesture, a predefined rate of deceleration after the initial speed of travel of the flick gesture, and coordinate data of the second screen and the third screen on the smart table based on the determination that the extrapolated line intersects at least one of the second screen and the third screen; and display a message on the first screen that permits the user to select a shared area display to transfer the data to at least one of the second and third screens in response to the displayed message as an alternative to detecting the flick gesture on the first screen.

2. The method of claim 1, wherein the first screen and the second screen each include a main area and a share area, and wherein displaying the copy of the data comprises displaying the copy of the data in the share area of the second screen, and the main area of the first screen displays the same data displayed on the first user device.

3. The method of claim 1, wherein the detecting the data being moved comprises detecting a touch screen input at the first screen.

4. The method of claim 2, wherein the share area of the first screen corresponds to the second screen based on a spatial relationship between the first screen and the second screen.

5. The method of claim 1, wherein the displaying the copy of the data comprises displaying the copy of the data moving across the second screen in a direction along the extrapolated line.

6. The method of claim 1, further comprising:
   detecting acceptance by the second user device of the copy of the data; and
   causing a copy of a file associated with the data to be transferred from the first user device to the second user device based on the acceptance.

7. The method of claim 1, further comprising:
   detecting denial by the second user device of the copy of the data; and
   removing the copy of the data from the second screen based on the denial and without transferring a file associated with the data from the first user device to the second user device.

8. The method of claim 1, further comprising displaying a message on the second screen, wherein the message comprises a first input field that indicates acceptance of the copy of the data and a second input field that indicates denial of the copy of the data.

9. The method of claim 8, wherein the message further comprises at least one of:
   a filename associated with the data;
   a user name associated with a user of the first screen; and
   an avatar associated with the user of the first screen.

10. The method of claim 1, wherein the linking is performed based on receiving a registration of a first user at the first screen and a registration of a second user at the second screen, and the first user device and the second user device are mobile devices.

11. The method of claim 1, wherein a service provider at least one of creates, maintains, deploys and supports the computer infrastructure.

12. The method of claim 1, wherein steps of claim 1 are provided by a service provider on a subscription, advertising, and/or fee basis.

13. The method of claim 1, further comprising deploying a system for providing collaboration, wherein the deploying comprises providing the computer infrastructure operable to perform the steps of claim 1.

14. The method of claim 1, wherein the first screen includes a main area and a share area, the second screen includes a main area and a share area, separate and distinct from the share area of the first screen, the detecting the manipulation includes detecting the data being moved from the main area of the first screen to the share area of the first screen, the displaying of the copy of the data on the second screen includes causing a copy of the data to appear on the share area of the second screen, separate from the display of the data on the share area of the first screen, in response to detecting the data being moved from the main area of the first screen to the share area of the first screen, and the acceptance of the copy of the data displayed on the second screen includes moving the copy of the data from the share area of the second screen to the main area of the second screen.

15. A computer program product comprising a computer readable storage medium having readable program code embodied in the computer storage medium, the computer program product includes at least one component operable to:
  wirelessly link a first user device, which includes a processor and a display, to a first screen of a smart table;
  wirelessly link a second user device, which includes a processor and a display, to a second screen of the smart table;
  display, on the first screen, an icon of a file stored on the first user device;
  detect manipulation of the icon on the first screen, wherein the detecting the manipulation includes detecting a flick gesture of the data on the first screen;
  display a copy of the icon on the second screen based on the detecting the manipulation;
  detect one of acceptance and denial at the second screen based on the displaying the copy of the icon;
  when denial is detected, remove the copy of the icon from the second screen;
  determine a direction of the flick gesture;
  extrapolate a line based on the determined direction;
  determine whether the extrapolated line intersects the second screen and a third screen which is located on the smart table, based on coordinate data regarding spatial locations of the second screen and the third screen on the smart table;
  determine a speed of the flick gesture;
  determine whether an intended recipient of the data on the first screen is the second screen or the third screen based on an initial speed of travel of the flick gesture, a pre-defined rate of deceleration after the initial speed of travel of the flick gesture, and coordinate data of the second screen and the third screen on the smart table based on the determination that the extra dated line intersects at least one of the second screen and the third screen; and
  display a message on the first screen that permits the user to select a shared area display to transfer the data to at least one of the second and third screens in response to the displayed message as an alternative to detecting the flick gesture on the first screen.

16. The computer program product of claim 15, wherein:
  the detecting the manipulation further comprises detecting touch screen movement of the icon from a main area of the first screen to a share area of the first screen;
  the share area of the first screen corresponds to a share area of the second screen, and the share area of the second screen is separate and distinct from the share area of the first screen;
  the acceptance of the copy of the icon displayed on the second screen includes moving the copy of the icon from the share area of the second screen to the main area of the second screen; and
  the displaying of the copy of the icon on the second screen includes causing a copy of the icon to appear on the share area of the second screen, separate from the display of the icon on the share area of the first screen, in response to detecting the icon being moved from the main area of the first screen to the share area of the first screen.

17. A system comprising:
  a smart table comprising screens;
  a CPU, a computer readable memory and a computer readable storage media;
  program instructions to link a first user device, which includes a processor and a display; to a first one of the screens, and a second user device, which includes a processor and a display, to a second one of the screens, wherein the first user device and the second user device are separate devices from one another and from the first one of the screens and from the second one of the screens;
  program instructions to display an icon, corresponding to data stored on the first user device, on the first one of the screens;
  program instructions to display a copy of the data stored on the first user device on the second one of the screens based on detecting manipulation of the icon of the data on the first one of the screens, wherein the detecting the manipulation includes detecting a flick gesture of the data on the first screen;
  program instructions to determine a direction of the flick gesture;
  program instructions to extrapolate a line based on the determined direction;
  program instructions to determine whether the extrapolated line intersects the second screen and a third screen which is located on the smart table based on coordinate data regarding spatial locations of the second screen and the third screen on the smart table,
  program instructions to determine a speed of the flick gesture;
  program instructions to determine whether an intended recipient of the data on the first screen is the second screen or the third screen based on an initial speed of travel of the flick gesture, and a pre-defined rate of deceleration after the initial speed of travel of the flick gesture, and coordinate data of the second screen and the third screen on the smart table based on the determination that the extrapolated line intersects at least one of the second screen and the third screen; and
  program instructions to display a message on the first screen that permits the user to select a shared area display to transfer the data to at least one of the second and third gesture on the first screen;
  wherein the program instructions are stored on the computer readable storage media for execution by the CPU via the computer readable memory.

18. The system of claim 17, wherein the first one of the screens includes a main area and a share area, the second one of the screens includes a main area and a share area, separate and distinct from the share area of the first one of the screens, the detecting the manipulation includes detecting the icon of the data being moved from the main area of the first one of the screens to the share area of the first one of the screens, the displaying of the copy of the data on the second one of the screens includes causing a copy of the data to appear on the share area of the second one of the screens, separate from the display of the data on the share area of the first one of the screens, in response to detecting the data being moved from the main area of the first one of the screens to the share area of the first one of the screens, and the acceptance of the copy of the data displayed on the second one of the screens includes moving the copy of the data from the share area of the second one of the screens to the main area of the second one of the screens.

* * * * *